May 17, 1966     D. M. FORD     3,251,552
EXHAUST NOZZLE FOR JET OR ROCKET MOTORS
Filed March 7, 1963
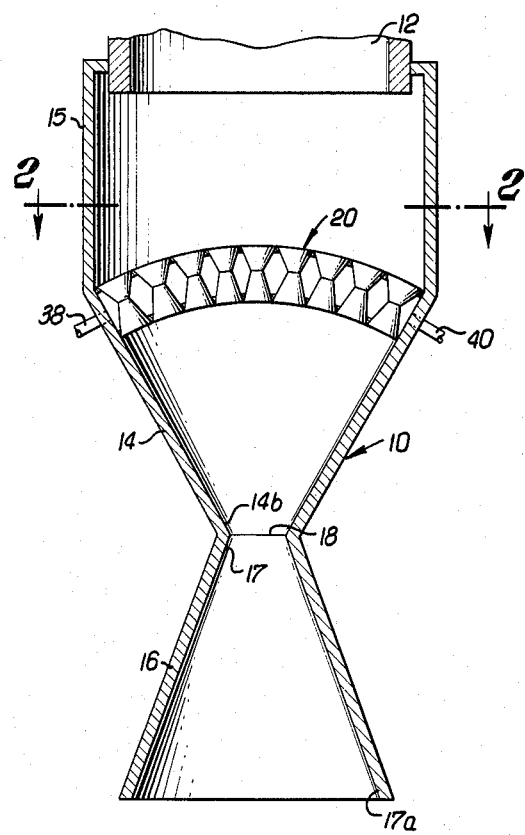
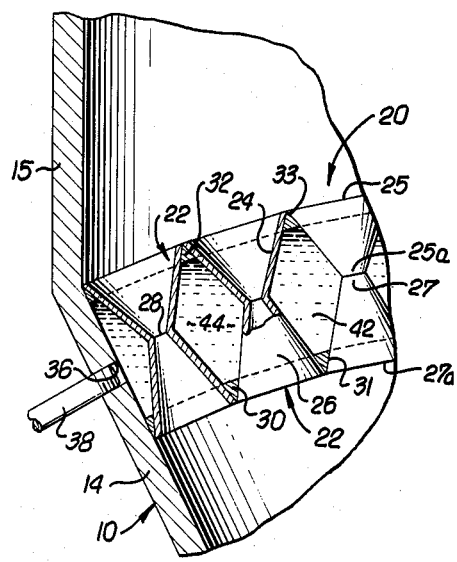
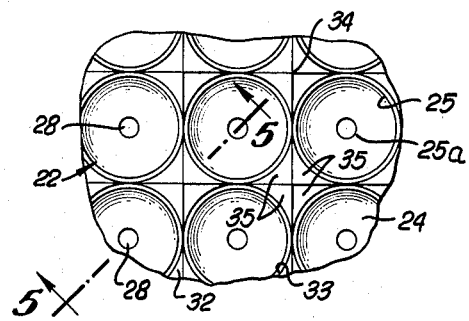
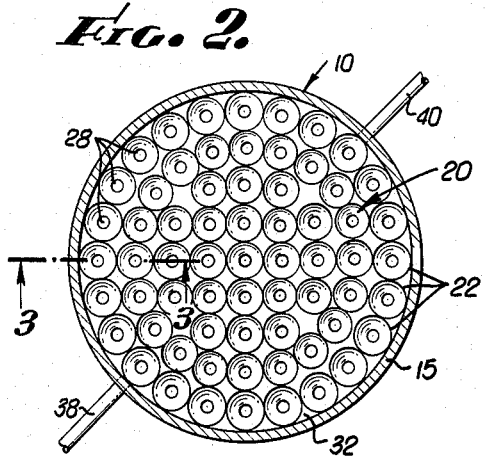
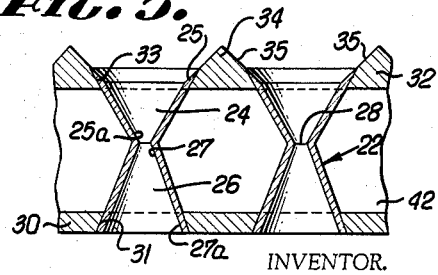
INVENTOR.
DOUGLAS M. FORD
BY
Huebner & Worrel
ATTORNEYS.

United States Patent Office 3,251,552
Patented May 17, 1966

3,251,552
EXHAUST NOZZLE FOR JET OR ROCKET
MOTORS
Douglas M. Ford, 2311 Arlington Ave.,
Anaheim, Calif.
Filed Mar. 7, 1963, Ser. No. 263,538
6 Claims. (Cl. 239—127.1)

This invention relates to a high pressure exhaust nozzle for a jet engine, and more particularly to a nozzle which is of the converging-diverging type and which may be used with any of the well known types of jet propulsion engines.

With the advent of jet and rocket propelled missiles and aircraft, it has been one of the major aims to develop all parts of the missile or jet propulsion motor to a point where a greater thrust or forward movement of the missile or aircraft can be achieved.

An object of the present invention is to provide a jet propulsion exhaust nozzle which will increase the velocity of the gases discharged from a combustion chamber of a rocket or jet propulsion motor through the principal of constriction followed by immediate expansion.

Another object of this invention is to provide a convergent-divergent exterior exhaust nozzle wherein a plurality of relatively small convergent-divergent nozzles are utilized within a main convergent-divergent nozzle.

A further object of this invention is to provide an exhaust nozzle which will create a primary and secondary velocity gain of the exhaust gases passing from a combustion chamber so that the total forward thrust or forward movement of the engine will be greatly increased.

These and other objects will become apparent during the course of the following part of this specification, wherein the details of construction thereof are described with reference to the accompanying drawing, in which:

FIGURE 1 is a cross-sectional view of the jet exhaust nozzle;

FIGURE 2 is a view taken on line 2—2 of FIGURE 1 showing a plurality of smaller nozzles within the master nozzle;

FIGURE 3 is an enlarged sectional view taken on line 3—3 of FIGURE 2 showing the details of construction of the inner smaller interior exhaust nozzles and cooling means;

FIGURE 4 is an enlarged view of some of the smaller interior exhaust nozzles from the ends facing the combustion chamber; and FIGURE 5 is a view taken on line 5—5 of FIGURE 4 showing additional construction features of the interior exhaust nozzles.

The invention comprises a master or exterior exhaust nozzle or second velocity gain means generally designated 10 which may be affixed to a combustion chamber 12 (not shown in detail) of a jet or rocket propulsion motor. While the drawing illustrates the exhaust nozzle 10 as being a separate entity, it should be realized that in the construction of jet or rocket propulsion motors, the nozzle 10 usually is formed as an integral part of the motor mechanism.

The exhaust nozzle 10 comprises three axially aligned sections, a convergent circular section 14 having an enlarged end 14a and a reduced end 14b, an annular projecting extension 15 extending from the end 14a of the section 14 and adapted to engage the combustion chamber 12, and a divergent circular section 16 having a reduced end 17 and an enlarged end 17a and extending from the reduced end 14a of the section 14. The respective sections 14 and 16 form a restricted throat or opening 18 where they are joined at their reduced ends 14b and 17. While the exhaust nozzle 10 has been referred to in sections, it should be noted that the entire nozzle 10 may be formed from a single sheet of material into the desired shape, or, the sections could be individually secured together by any well known means. Additionally, the sections 14 and 16 may be referred to as frusto-conical sections 14 and 16, because the converging walls are stopped short of the apex and cut on lines perpendicular to the axes of the cones forming the respective ends 14a and 17.

Within the upper portion of the convergent circular section 14 adjacent end 14a, there is positioned a first velocity gain means generally identified as 20. This first velocity gain means includes a plurality of smaller convergent-divergent exhaust nozzles generally designated 22 which conform in shape and configuration to the shape and configuration of the exhaust nozzle 10. These convergent-divergent nozzles 22 are arranged across the interior of the section 14, such as shown in FIGURE 2 and in the same general axial alignment as that of the master exhaust nozzle 10.

These nozzles 22 each consist of identical parts; namely, convergent circular sections 24 having enlarged ends 25 and reduced ends 25a, and divergent circular sections 26 having reduced ends 27 and enlarged exhaust ends 27a. The respective sections 24 and 26 each form restricted throats or openings 28 where they are joined at their reduced ends 25a and 27.

The nozzles 22 are maintained in position between a pair of parallel forward and rear plates 30 and 32 respectively. These plates are domed shaped having their convex sides toward the axial flow of exhaust gases from the combustion chamber 12, such as is seen in FIGURE 1. Each of the nozzles 22 mounted therebetween have their individual axes generally radially directed toward the throat 18. The plates 30 and 32 are formed with a plurality of tapered holes 31 and 33. These holes accommodate the converging and diverging walls of the sections 24 and 26 as best seen in FIGURES 3 and 5. Additionally, the rear plate 32 is formed with projecting conical deflecting guide means 34. These deflecting guide means 34 have sides 35 of an angle usually common to the angle of the converging section 24. The resultant group of nozzles 22 give the appearance of a honeycomb, such as is seen in FIGURE 2.

In operation, as the exhaust gases are expelled from the combustion chamber 12, they are urged outwardly toward the first velocity gain means 20. As the gases strike the conical deflecting guides 34, they are channeled through the convergent sections 24 to the reduced throats 28, at which point they are restricted. As the gases pass through the throat into the divergent sections 26, there is created a sudden adiabatic expansion of the gases with a resultant increase in velocity of the gases.

Once the accelerated or stepped up exhaust gases have passed through the nozzles 22, and due to the radially directed gas flow from the nozzles 22, the gases will be directed at the throat 18 through the convergent section 14 of the master exhaust nozzle 10 into the restricted throat 18. With the increased gas velocity entering the section 14, there will be a second restriction at the throat 18 and a second velocity gain will occur as the gases are expelled through the throat 18 into the divergent section 16.

In this way, it will be seen that a double velocity gain of the gases is created. By this increased velocity, greater thrust per pound of jet fuel will be achieved.

In view of the great intensity of heat in the region of the minor nozzles 22, a coolant system has been provided. A tapped bore 36 is formed in the wall of the convergent section 14, best illustrated in FIGURE 3, to receive an inlet pipe 38. There is also provided diametrically opposite the inlet pipe, an outlet pipe 40, as best seen in FIGURE 2. The inlet pipe and outlet pipe communicate with spaces 42 created between the respective nozzles 22 and plates 30 and 32. The spaces 42 each communicate with adjacent spaces forming a continuous chamber. A coolant material 44 is circulated in the spaces 42 by being pumped through the inlet pipe 38 and is expelled through the outlet pipe 40. The coolant 44 may be fuel when using a liquid fuel jet motor, and it may be circulated from a storage section to the nozzle and back to the storage section, thus eliminating the need for additional coolant liquid which would increase the weight factor of the jet motor.

While the invention herein shown and described is what is conceived to be the most practical and preferred embodiment, it is recognized that departures may be made therefrom within the scope of the invention, which is not to be limited to the details disclosed herein, but is to be accorded the full scope of the claims so as to embrace any and all equivalent structures.

I claim as my invention:

1. An exhaust nozzle for use with a combustion chamber of a jet motor to increase the velocity of exhaust gases, said nozzle being generally axially aligned with the flow of said gases and comprising a master velocity gain means coupled to said combustion chamber including a master reduced portion disposed in the axial path of said exhaust gases, said master reduced portion being formed by walls which are tapered to converge to and diverge from a throat restricted so that substantial acceleration due to sudden expansion of the gases occurs as they thereafter pass between the diverging walls, a minor velocity gain means within said master velocity gain means including at least one minor reduced portion disposed generally in the axial path of said exhaust gases, said minor reduced portion being formed by walls which are tapered to converge to and diverge from a throat restricted so that substantial acceleration due to sudden adiabatic expansion of the gases occurs as they thereafter pass between the diverging walls, said minor velocity gain means disposed between said combustion chamber and said master reduced portion, whereby said flow of exhaust gases will enter said minor velocity gain means and be increased in velocity as they are expelled through said minor reduced portion to said master reduced portion where said accelerated gases will again be increased in velocity as they are expelled from said master reduced portion, and said minor velocity gain means includes at least an annular first section convergent generally along the axis of said gas flow and ending in said minor reduced portion, and an annular second section extending from said minor reduced portion and diverging from said minor reduced portion toward said master reduced portion, and wherein there are a plurality of said minor velocity gain means each having their individual axis generally radially directed to said master reduced portion.

2. An exhaust nozzle as defined in claim 1 wherein cooling means are provided to reduce the temperature of said minor velocity gain means when said exhaust gas passes through said velocity gain means.

3. An exhaust nozzle as defined in claim 2 wherein the cooling means includes a liquid coolant.

4. A high pressure nozzle for use with a combustion chamber of a jet motor to effectively increase the thrust potential of said motor, said nozzle communicating with said chamber and axially aligned with the flow of gases from said chamber and comprising a frusto-conical master first section converging away from said chamber including a reduced end remote from said chamber, said first section connected to said chamber, a frusto-conical master second section diverging away from said chamber including a reduced end of a diameter equal to the diameter of said first section reduced end and connected therewith, said reduced ends forming a reduced throat which is sufficiently restricted so that such gases are substantially accelerated due to sudden adiabatic expansion as they pass through the diverging master second section, a plurality of minor velocity gain means including frusto-conical minor first sections converging away from said chamber including reduced ends remote from said chamber, a plurality of frusto-conical minor second sections diverging away from said chamber including reduced ends of diameters equal to the diameters of said minor first section reduced ends and connected respectively therewith, said reduced ends forming reduced throats which are sufficiently restricted so that such gases are substantially accelerated due to sudden expansion as they pass through the minor diverging second section, said minor velocity gain means disposed within said frusto-conical master first means between said master throat and said chamber, whereby said flow of exhaust gases will enter said minor velocity gain means and be increased in velocity as they are expanded through said reduced throats to said master throat where said accelerated gases will again be increased in velocity as they are contracted and expanded through said master throat.

5. A high pressure nozzle as defined in claim 4 wherein said minor velocity gain means are suspended between two plates which are domed shaped having their convex sides toward the axial flow of said exhaust gases from the chamber, and each of said minor velocity gain means having their individual axes generally radially directed to said master throat.

6. In a high pressure exhaust nozzle communicating with a combustion chamber of a jet motor to effectively increase the thrust of said motor by increasing the velocity of exhaust gases from said chamber, said nozzle including a convergent sloping outer shell secured at its largest end to said chamber and a divergent sloping outer shell connected at its small end to the smaller end of said convergent shell forming a restricted throat that is sufficiently reduced in size so that when the gases pass through the divergent outer shell a substantial acceleration due to sudden adiabatic expansion occurs in the flow of gases, said nozzle containing a minor velocity gain means disposed between said throat and said chamber, said minor velocity gain means comprising a bank of nozzles each having an axial axial cross sectional configuration similar to said high pressure exhaust nozzle, said nozzles generally radially directed toward said throat, whereby said exhaust gases will first encounter said minor velocity gain means and be accelerated and secondly will encounter said throat and be further accelerated to increase the thrust of said motor.

References Cited by the Examiner

UNITED STATES PATENTS

| | | | |
|---|---|---|---|
| 2,342,996 | 2/1944 | Barker et al. | 60—35.6 X |
| 2,510,572 | 6/1950 | Goddard. | |
| 2,551,115 | 5/1951 | Goddard. | |
| 2,841,362 | 7/1958 | Yeomans | 253—39.1 X |
| 2,862,447 | 12/1958 | Lyon | 60—35.6 X |
| 2,967,393 | 1/1961 | Von Braun | 60—39 X |
| 3,011,309 | 12/1961 | Carter | 60—35.6 |

MARK NEWMAN, *Primary Examiner.*

SAMUEL LEVINE, *Examiner.*

D. HART, *Assistant Examiner.*